United States Patent [19]

Holdiman et al.

[11] E Re. 31,536

[45] Reissued Mar. 13, 1984

[54] METAL CLADDED WINDOW PRODUCTS

[76] Inventors: Joseph W. Holdiman, 1095 Arrowhead Dr., Dubuque, Iowa 52001; Douglas E. Justice, 1103 Ellen, Cedar Falls, Iowa 50613

[21] Appl. No.: 383,461

[22] Filed: Jun. 1, 1982

Related U.S. Patent Documents

Reissue of:

[64] Patent No.: 4,207,707
Issued: Jun. 17, 1980
Appl. No.: 925,162
Filed: Jul. 17, 1978

[51] Int. Cl.[3] ..... E06B 3/00

[52] U.S. Cl. ..... 49/501; 49/504

[58] Field of Search ..... 49/501, 504; 52/213, 52/208, 204, 716

[56] References Cited

U.S. PATENT DOCUMENTS 3,411,247 11/1968 Flemi ng ..... 49/501
3,815,285 6/1974 Kuyper ..... 49/501
3,918,231 11/1975 Kessler ..... 49/501 X
4,122,633 10/1978 Holdiman ..... 49/501

FOREIGN PATENT DOCUMENTS 169232 11/1959 Sweden .

*Primary Examiner*—Philip C. Kannan

[57] ABSTRACT

This invention relates to a metal clad window product. The window frame and sash are basically made of milled, elongated wooden members with suitable interconnecting parts, such as mortises and tenons, at the ends of the same. A metal cladding member is attached to each elongated member before assembly of the window parts. The metal cladding member has flanges formed integral therewith which fit into rabbets in the sides of the elongated wooden members forming the frame and sash parts to secure the cladding to the part. The cladding includes an extension at one edge thereof which forms with suitable stop members in the assembled sash, a mounting for a glazing panel assembly. In the case of the window frame, the extension forms the mounting of the weather seal for sealing the sash to the window frame.

11 Claims, 4 Drawing Figures

22
89
92
90
16
96
95
98
24
60
25
75
70
55
53
18
51
40
15
24
90
97
20
50
30
41
52

METAL CLADDED WINDOW PRODUCTS

Matter enclosed in heavy brackets [ ] appears in the original patent but forms no part of this reissue specification; matter printed in italics indicates the additions made by reissue.

FIELD AND BACKGROUND OF THE INVENTION

Our invention relates to metal cladded wood products and more particularly to wood products, such as windows or doors, in which metal cladding is installed on the window parts before assembly of the same into a completed product.

Windows and doors have been extensively made of wood, primarily because it is easily milled and assembled and because it has an attractive appearance. However, such material is subject to weathering, particularly in external locations or on external surfaces. To protect against such deterioration or weathering, attempts have been made to apply a thin metallic surface, in the form of a cladding surface, to the external surfaces of a product of this type. The U.S. Pat. No. 3,815,285 shows an arrangement of this type in which a metal cladding is applied to the exterior surface after assembly of the wood product. This arrangement has not proved completely satisfactory because of the costs of the parts and the labor of installation as well as the fact that the cladding is not permanently attached to the wood surface.

Other attempts have been made to apply a cladding material to a portion of a milled part of a window product prior to assembly. These have resulted in relatively structurally unsound window components [because the cladding is fixed to the wood such as to allow no differential expansion between materials].

SUMMARY OF PRESENT INVENTION

The present invention is directed to a window product in which the rails, stiles, jambs, headers and sills are cut from wood stock and milled in a conventional manner. In addition, rabbets are milled in the elongated wooden members so that a preformed metal extrusion or cladding may be attached to the facing surface of the elongated members prior to assembly of the members into the frame and sash parts of the window product. The wooden members are interconnected through conventional mortise and tenons joints and the cladding, which is [a] *an* extrusion, has flanges relatively loosely fitting into the rabbet to secure the cladding to the individual pieces prior to the assembly of the parts. The cladding has mitered joints or ends of the same which abut to form a mitered joint with a suitable sealant material added below the joint and to the wood surface to seal the metal joints to the wood product. The loose fit of the flange of the cladding member into the slot of the rabbet allows for relative expansion of the materials, and the cladding is formed with an extension which, in the case of the sash, provides a support for a glazing panel assembly in the sash. In the case of the frame, the extension mounts a seal or cushion to position the sash in the frame.

The improved arrangement in a metal clad window product overcomes the objections in the prior art in that it overcomes time-consuming methods of installation of cladding on existing window, or fitting metal cladding to parts and securing the same thereto prior to assembly. In the improved arrangement of parts, the metal cladding is sized at the time the frame and sash parts are constructed and it is slidably positioned thereon. The wooden parts are assembled and secured in a conventional manner with the cladding parts mating in mitered joints to which sealant material is applied. This provides an attractive metal cladding window product which requires a minimum use of members and a minimum of installation time. Further, the metal cladding is so attached to the wooden frame parts that it is relatively movable to a limited degree to allow for a differential expansion therebetween insuring that the joints and seals will be properly maintained.

IN THE DRAWINGS

Description of the Preferred Embodiment

Figures 1, 3:
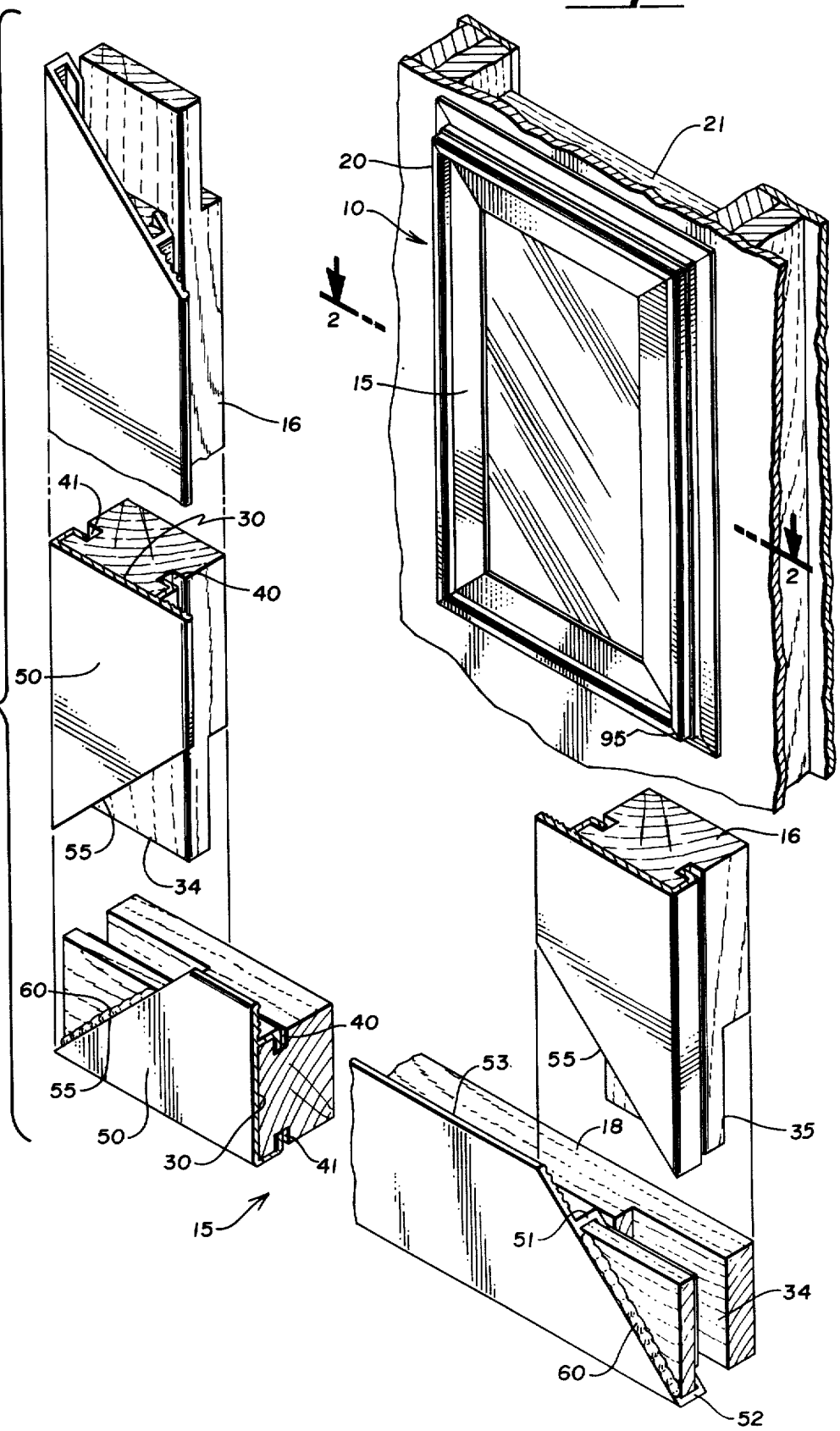
FIG. 1 is a perspective view of a window frame and sash constructed in accordance with the present invention.
FIG. 3 is a broken [prospective] *perspective* view of a sash constructed in accordance with the present invention; and, FIG. 4 is a cross-sectional perspective view of a corner of the window of FIG. 1.

Our improved metal cladded window product is shown generally at 10 in FIG. 1. It is comprised of a sash 15 and a surrounding and supporting frame 20 with the sash being adapted to be movable or fixed relative thereto, depending upon the application of the same. Frame 20 is comprised of the header 21, side jambs 22, and a sill 24 which may form a single unit or may be readily interconnected to a similar frame for a double unit depending upon the application. Similarly, the sash 15 is comprised of stiles 16 and rails 18 suitably interconnected to support a glazing panel assembly 25 which may take a variety of forms.

Figure 2:
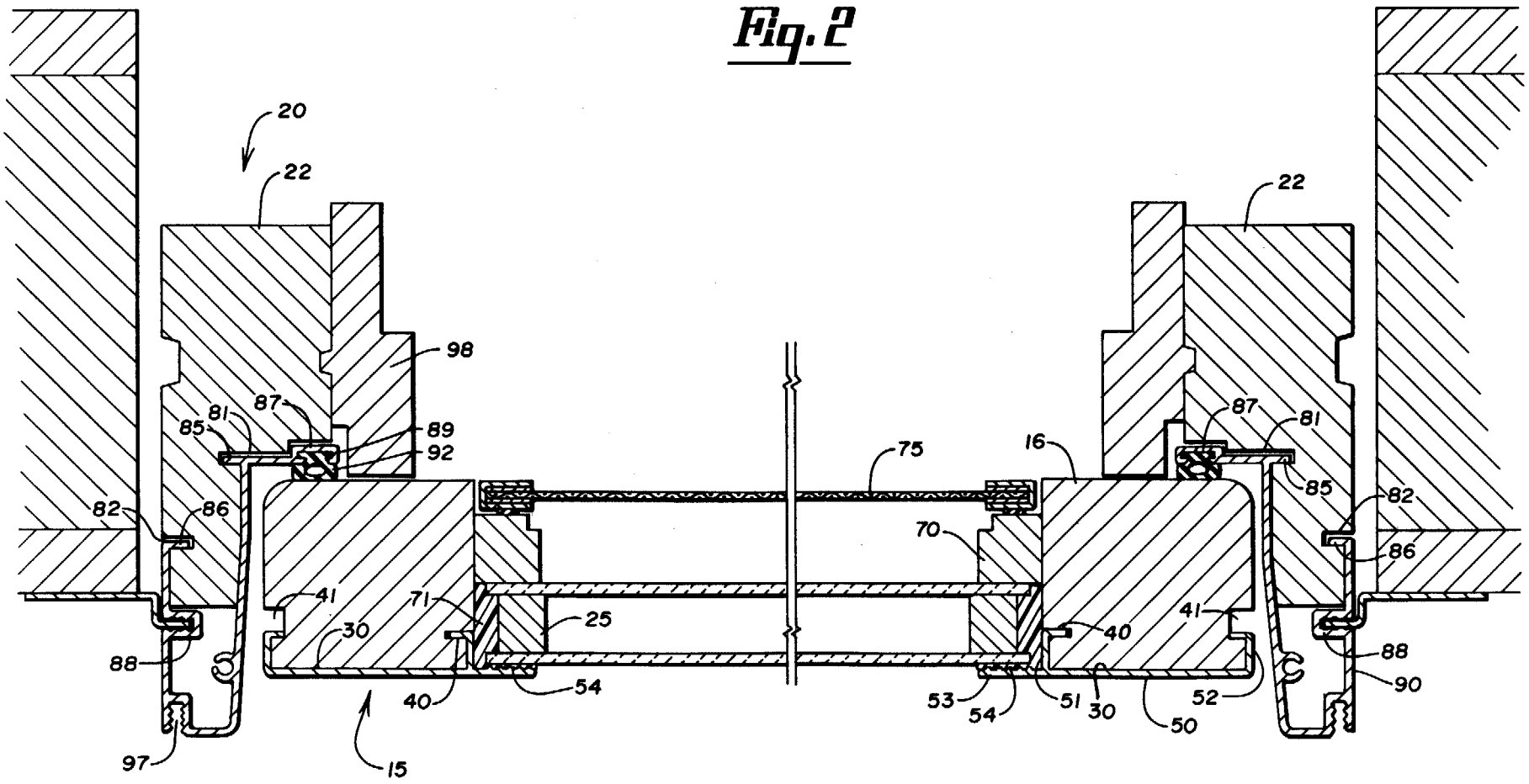
FIG. 2 is a sectional view of the window of FIG. 1 taken along the lines 2—2 therein.
Figure 4:
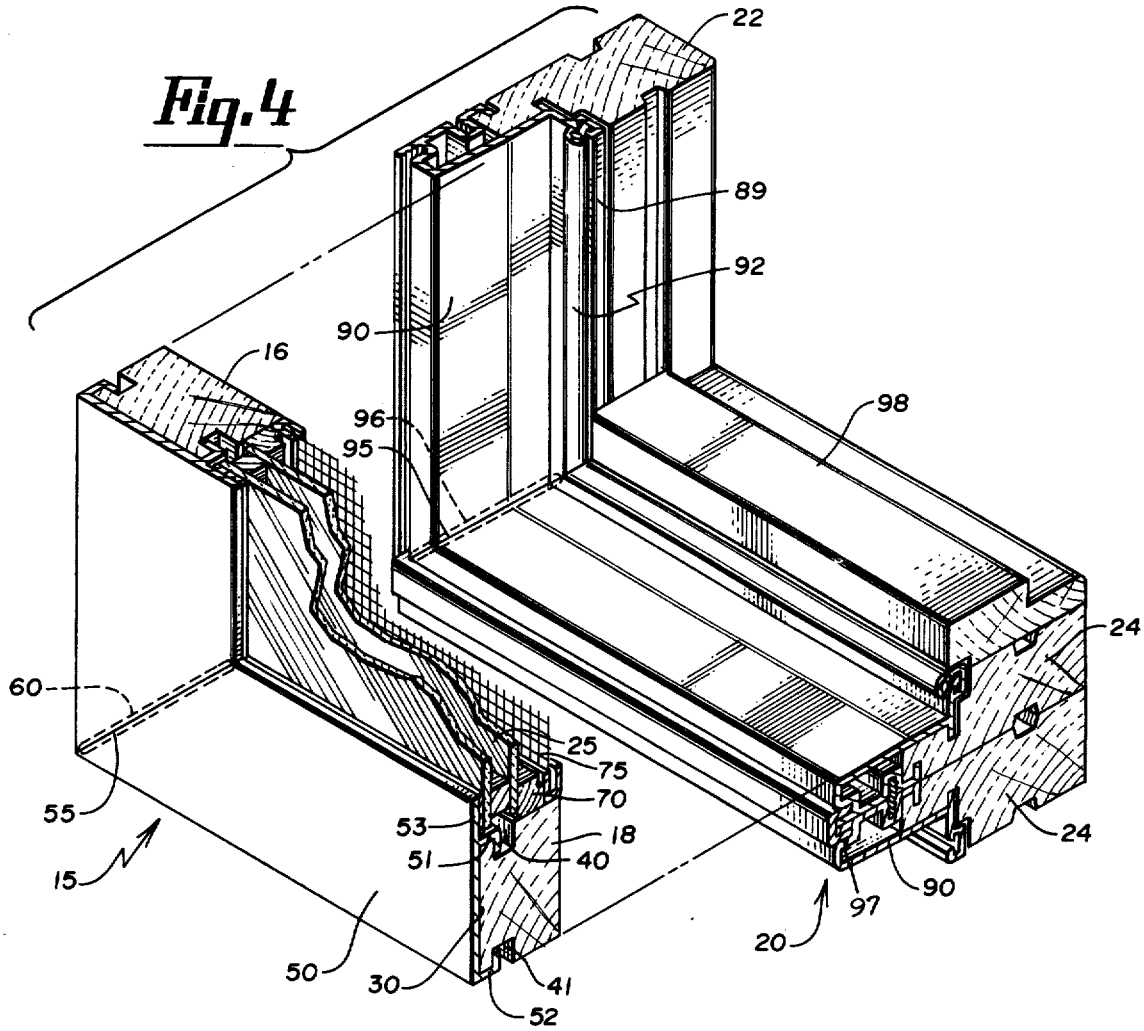

As will be best seen in FIGS. 2, 3, and 4, sash 15 or its rails 18 and stiles 16, are each formed of an elongated wooden member which is suitably milled to provide a front and rear finished surface with suitable mortises 34 and tenons 35 respectively, at alternate ends of the same by means of which the rails and stiles may be held in assembled relationship. The mortises and tenons are interconnected to provide an overlapping wood joint which is suitably secured by gluing, stapling, or other conventional means. The elongated members forming the rails and stiles each have rabbets 40, 41 on [each] *an inner and outer* side *respectively,* of the [same] *wooden member* adjacent to the front face 30 of the elongated member. [As can be seen in the Figures, at least the exposed rabbet 40 is of much greater width than required for the flange to be inserted therein. The purpose for this construction will be explained below.]

A metal cladding member 50 is positioned over the front face 30 of each stile and rail. The metal cladding member is preferably an extruded metal product, such as aluminum, having a finished surface. As will be seen in FIGS. 2, 3, and 4, the metal cladding members 50 have a generally flat extent with a pair of L-shaped flanges 51, 52 formed integral therewith and extending from one side of the flat surface. These flanges have generally the same dimensions. In addition to the flanges, the cladding member has an extension 53 *along its length* which extends *beyond the front face 30 adjacent*

*the inner side of the wooden member and which extends* beyond one of the flanges 51 thus placing flange 51 intermediate the width edges of the cladding member, with the opposite flange 52 being disposed at one edge of the cladding member. The extension 53 has a roughened undersurface, as indicated at 54, for purposes to be later noted. The flanges and extensions extend the complete length of the cladding member and the cladding members are cut to correspond with the length of the elongated wood members forming the rails and stiles 18 and 16. When each cladding member is slipped over the front surface of the respective elongated wood member, the general extent of the inner side of the flat surface is disposed in contact with the milled front face of the elongated member with the L-shaped flanges 51, 52 *each having a free end* disposed in the rabbets 40, 41 respectively. The flanges are of such a size that the cladding member must be slipped on rather than snapped on as in prior art windows. This insures positive locking and gives structural strength to the assembly. As will be seen in FIG. 2, the rabbet 41 maybe of a larger dimension than dimension of the rabbet 40. The flange 52 fitted in rabbet 41 is relatively loose [from front to back] so as to permit movement between the cladding member in the [width and] length direction of the flat surface and the elongated member to allow for relative expansion between the materials forming the same. The flanges, however, retain the cladding members on the elongated members. The cladding members have a mitered extremity, as indicated at 55, at either end of the same. The elongated members forming the rails and stiles 18 and 16, are then assembled through the mortise and tenon joints at the ends of the elongated members to provide an overlap of the same. They are secured in assembled relationship by gluing, stapling or by nailing.The cladding members have mitered extremities which fit together in a mitered butt joint and suitable sealant material, indicated at 60, is positioned on the surface of the elongated members beneath the mitered butt joints to seal the joints and prevent entrance of moisture between the cladding members and the wood surfaces beneath the same.

The overall strength of the resulting sash with the [overlaping] *overlapping* cladding members is greatly enhanced by the deep locking of the cladding member to the frame. The frame parts or sash parts are secured in assembled relationship with the cladding members forming a metal facing surface for the same. After the sash has been assembled with the cladding members thereon, suitable stop members 70 may be added to the inner face of the opening formed in the stiles and rails. The stop member 70 with the extension 53 of the cladding member forms an outwardly extending open rabbet within which the glazing panel [assemble] *assembly* 25 is positioned. Suitable sealing material 71, such as glazing compound, will seal the glazing panel assembly within this rabbet. If desired, suitable screening, such as is shown at 75, may be mounted in the opening to the opposite end of the stop member 70. The roughened surface 54 of the extension aids in holding the glazing sealant 71 within the rabbet to secure the glazing panel assembly therein.

Frame 20 is similarly formed of elongated milled wooden members which form the header, jambs and sill 21, 22, 24 respectively. These elongated members have milled front and rear surfaces along the extent of the same with suitable means to connect the members to form the frame at the ends of the members. Thus, they may include mortise and tenons, or mitered joints or other equivalent interconnecting surfaces. Similarly, the elongated members forming the frame parts may be suitably secured by gluing, nailing, or other means. The *inner and outer* sides of the elongated members forming the frame parts have outwardly extending open rabbets 81, 82 *respectively*, therein, with the cross-sectional shape of the elongated members being different from that of the sash for the purpose of providing recessed opening in which the sash will be positioned. Suitable cladding members 90 are added to the front of the frame parts or the elongated members to provide a metallic facing surface. As will be best seen in FIGS. 2 and 4, the cladding members 90 have flanges 85, 86 extending therefrom with an extension 87 to one side of the cladding member beyond the intermediate extension 85. In addition, these cladding members have a projecting surface 88 in the sill, header and jamb to space a portion of the cladding member from the front face of the milled elongated member. These cladding members are slidably positioned over the front face of the frame parts with the flanges 85, 86 riding in the open rabbets 81, 82 in the elongated members to secure the same thereto. The cladding members 90 are added to the frame parts of the window frame prior to the assembly of parts in the complete frame, as header, jambs, and sill. They are slid into position and the ends of the cladding members are mitered, as at 95, to form butt joints between the cladding members as the elongated members forming the frame parts are assembled and secured. In the area of the joints [beneath the wood portions of the frame parts] *between the cladding members 90*, suitable sealant material, such as 96 is added thereto. The cladding members may also include a plowed or notched extremity extending the length of the cladding member, as at 97, by means of which adjacent frames may be attached or a double unit may be provided as a window sill. Similarly, the extensions 87 of the cladding member have bracketed extremites 89 by means of which suitable weather stripping 92 may be mounted along the extent of the same and surrounding the opening in the frame. Suitable trim parts, such as stop member 98, may be added to the frame parts to provide a stop for the sash when the sash is positioned therein. The extensions with the weather stripping thereon form a seal for the sash in the opening of the frame. Suitable hardware may be added to the sash to pivot or otherwise mount the sash for movement relative to the frame for varying types of windows or the sash may be secured to the frame.

The improved window product construction provides an arrangement and mounting of the metal cladding on the facing surface of the frame and sash for protection to the exposed surface of the wooden frame parts and to add decoration to the same eliminating the problems of painting and maintenance. The cladding members, in addition to adding an area of protection, further strengthen the connections between the frame and sash parts and are relatively loosely positioned therein to allow for differential expansion between the materials forming the frame and sash. This eliminates the problems of breaking of seals or the opening of joints to detract from the appearance of the same.

In considering this invention it should be remembered that the disclosure is illustrative only and the scope of the invention should be determined by the appended claims.

What we claim is:

1. A metal clad window sash comprising: a plurality of rails and stiles forming the sash, each rail and stile being formed by an elongated milled wooden member having front and rear surfaces and an outwardly extending rabbet located on [each side] *inner and outer sides* of said member between the front and rear surfaces and extending the length thereof; a metal cladding member mounted onto each of said elongated *wooden* members by means of a pair of spaced L-shaped flanges formed integral therewith, *each flange having a free end* with the free [arm] *end* of said flange being of a substantial length so as to be fitable into said rabbets on said *elongated wooden* members only by being slid therein, thereby positioning said cladding member in full contact with the milled front surface of said *elongated* wooden member over the extent of the width and the length of said *elongated wooden* member, said cladding member having an extension [to the internal side of said flanges] *along its length which extends beyond the width of the front surface adjacent the inner side of said elongated wooden member*; the ends of said elongated *wooden* members forming the rails and stiles having mortises and tenons selectively such that the *elongated wooden* members overlap and fit together at the ends to form stiles and rails of the sash, said metal cladding member having mitered ends which fit together in a mitered butt joint; stop members positioned on [one] *the inner* side of each of the *elongated wooden* members forming the stiles and rails and spaced from and being parallel to the extension of the cladding members to form a rabbet to receive a glazing panel assembly; and sealing material positioned on said wooden members beneath the mitered joint of the cladding members [and sealed thereto] *to seal said joint*; the rabbets on the outer [edge] *side* of said [sash] *elongated wooden members* having a cross-sectional width greater than the thickness of the [engaged] *free* end of the L-shaped flange of the [mtal] *metal* cladding member fitting therein to provide a loose fit of the cladding member on the elongated *wooden* member to permit movement between the rails and stiles and said cladding member in the direction of the plane of the front surface of said *elongated* wooden member.

2. The metal clad window sash of claim 1 in which the spaced L-shaped flanges of the cladding members are non-flexible.

3. The metal clad window sash of claim 1 in which the [flanges and] extensions of the cladding members are formed integral with the cladding member.

4. The metal clad window sash of claim 3 in which the cladding member is an extruded aluminum product.

5. The metal clad window sash of claim 1 in which the glazing panel assembly is mounted in the rabbet formed by the extensions and the stop members with a glazing material therein.

6. The metal clad window sash of claim 5 in which the extensions of the cladding members have roughened surfaces facing the stop members.

7. The metal clad window sash of claim 6 in which the outwardly extending [open] rabbets located on the sides of the elongated members are parallel to one another and disposed in the same plane.

*8. A metal clad window product comprising:*

*a plurality of elongated members interconnected to form the configuration of a window frame or sash, each of said elongated members having front and rear surfaces and first and second sides located between said front and rear surfaces and a rabbet extending in each of said first and second sides for the length of said elongated member;*

*a metal cladding member coupled to each of said elongated members to form a metal cladding surface over the front surface of each elongated member, said metal cladding member including a metal member having a width and length sufficient to cover said front surface wherein said cladding member is in full contact with said front surface, first and second flanges integrally formed on said metal member so that said flanges are spaced from one another and each extend the length of said metal member, and a metal extension integrally formed with said metal member adjacent one of said flanges and extending the length of said metal member adjacent to the first side of said elongated member;*

*each metal cladding member being coupled to one of said elongated members prior to their interconnection to form said configuration solely by slidably engaging said flanges in said rabbets from one end of the elongated member until the metal member is positioned over the front surface of said elongated member along the entire length and width of the elongated member;*

*each metal cladding member being formed to have mitered ends which fit to form a mitered joint with adjacent metal cladding members on the elongated members forming said configuration; and*

*sealing material positioned between said metal member and said elongated member along each mitered joint to seal said mitered joints.*

*9. The metal clad window product of claim 8 including a sealing material coupled to said extensions along the length of said extension.*

*10. The metal clad window product of claim 8 further including a stop member coupled to the first side of each elongated member and being spaced from and parallel to the extension of the metal cladding member on said elongated member, each said stop member and extension forming a rabbet to enable said configuration to receive a glazing panel assembly.*

*11. The metal clad window sash of claim 10 further including a sealing material located adjacent the extension of each cladding member along its length to form a seal between the extension and a glazing panel assembly when a glazing panel assembly is disposed in the rabbets formed by said stop members and extensions.*

* * * * *